United States Patent [19]

Nichols, III et al.

[11] Patent Number: 4,542,432
[45] Date of Patent: Sep. 17, 1985

[54] GROUND FAULT DETECTION CIRCUIT

[75] Inventors: Edward L. Nichols, III, Clearwater; Edward A. Harrison, Largo, both of Fla.

[73] Assignee: Square D Company, Palatine, Ill.

[21] Appl. No.: 412,454

[22] Filed: Aug. 27, 1982

[51] Int. Cl.[4] .............................................. H02H 3/28
[52] U.S. Cl. ......................................... 361/44; 361/45
[58] Field of Search ...................... 361/44, 45, 46, 42, 361/47–50

[56] References Cited

U.S. PATENT DOCUMENTS 3,962,606  6/1976  Burns et al. .......................... 361/45
4,263,637  4/1981  Draper et al. ........................ 361/45

OTHER PUBLICATIONS

Physics Part II–Halliday et al., John Wiley & Sons, p. 902.

Standard Handbook for Electrical Engineers-McGraw-Hill Book Company, pp. 4–112.

Primary Examiner—Harry E. Moose, Jr.
Attorney, Agent, or Firm—Richard T. Guttman; Donald P. Reynolds; James W. Potthast

[57] ABSTRACT

A current monitoring circuit of a ground fault detector which receives its input from the secondary winding of an annular core transformer through which extends the current carrying leads being monitored. A resistor and capacitor are connected in series between the secondary winding and an AC amplifier to form an RLC band pass filter to minimize the circuits sensitivity to noise outside of the band of frequencies of interest. The sensitivity of the circuit to temperature changes due to fluctuations of the inductance is reduced by choosing an inductance value sufficiently high to ensure that it is not reduced to below a critical level at which sensitivity is effected.

23 Claims, 2 Drawing Figures

GROUND FAULT DETECTION CIRCUIT

DESCRIPTION

BACKGROUND OF THE INVENTION

This invention relates to a current to voltage amplifier circuit and, more particularly, to such a circuit used in a ground fault detection circuit.

Ground fault detection circuits are well known which will develop a detection signal that varies with very small currents being monitored. The current is amplified to produce a detection signal. When the detection signal exceeds a preselected level, a relay or the like is deenergized to disconnect power from the load. Such circuits are often used as ground fault, or short circuit, detectors.

Examples of low current detection circuits used in fault detectors and otherwise are shown in U.S. Pat. Nos. 3,815,013 of Milkovic; 3,851,216 of Clarke et al., 3,836,821 of Wahlgren et al.; 3,611,035 of Douglas; 4,263,637 of Draper et al. and 4,309,681 of Draper et al. Reference may be made to these patents for background and for more detailed information concerning the environment in which ground fault detection circuits are used and the nature of the problems encountered.

Briefly, one of the problems encountered in fault detectors is false fault detection due to ambient or line noise.

Another problem has been uncontrollable variations of trip levels due to temperature fluctuation and DC stability. Fluctuation in temperature has caused the inductance of the inductors in known circuits to decrease to levels at which the circuits response is affected. Negative coefficient thermistors and the like have been used to compensate for temperature variation with some success. However, the basic problem remains.

Ambient and line noise creates a particularily difficult problem due to the low magnitude of the currents being sensed. Known detectors lack the proper frequency response characteristics to minimize noise problems. In addition, known fault detection circuits use DC amplifiers which are susceptible to DC noise and DC supply voltage stability problems.

SUMMARY OF THE INVENTION

One of the objects of the present invention is to provide a detection circuit for monitoring electrical lines for ground faults in which an amplifier amplifies a detected fault current, and means including a filter are provided to alter the frequency response of the amplifier to minimize its sensitivity to noise.

In a preferred embodiment, the circuit is employed as a ground fault interrupter circuit for controlling power to a three-phase motor. The power leads extend through a toroidal core to form the primary winding of a differential current transformer. When an imbalance is created due to a ground fault, a small differential current is produced on the secondary winding which is monitored by the circuit of the present invention.

In keeping with this objective, in the preferred embodiment the secondary winding is coupled to an AC amplifier through an RLC series band pass filter. This filter and feedback capacitors on both of two amplifier stages provide the detection circuit with the desired frequency response. This minimizes the sensitivity of the circuit to noise at frequencies below the power line frequency and above a tickler signal frequency which is imposed on the lines in the event of a ground fault on the neutral lead. Advantageously, the inductance of the transformer is used as the inductance of the RLC band pass filter.

The amplifier has a frequency response and gain which substantially fluctuates with changes in the value of the inductance of the RLC filter for inductance values below a predetermined value. The transformer core is sensitive to temperature changes, such that a transformer with an inductance value above the predetermined value can be reduced to a value below the predetermined value by temperature changes.

Another object of the invention is, therefore, to provide an amplifier circuit with a response which does not fluctuate with temperature change and which is usable in a fault detection circuit. In the preferred embodiment this is achieved by making the toroidal core sufficiently large so that the transformer inductance will not be decreased beneath a critical value. Alternately, the transformer is provided with more turns.

BRIEF DESCRIPTION OF THE DRAWINGS

The foregoing objects, features and advantages will be described in greater detail and further features and advantages of the present invention will be made apparent from the following detailed description of the preferred embodiment which is given with reference to the several views of the drawing, in which.

DETAILED DESCRIPTION

Figure 1:
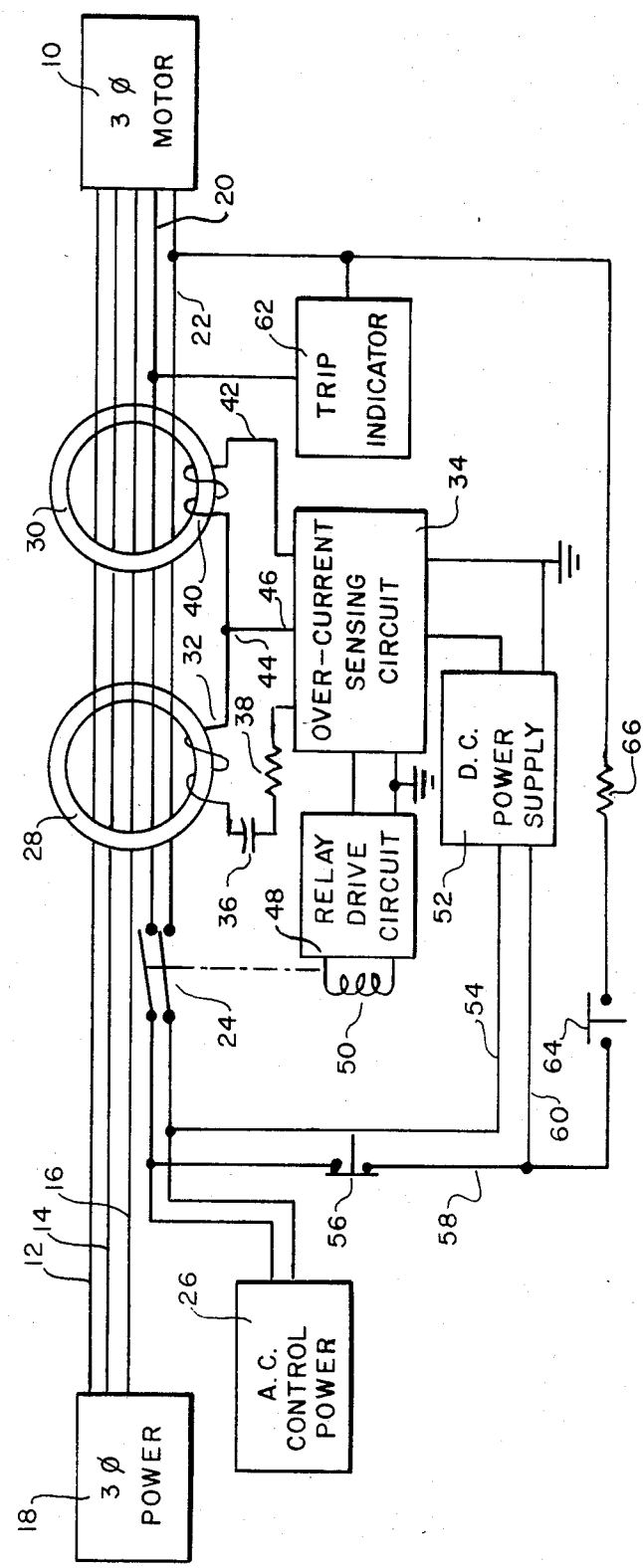
FIG. 1 is a schematic wiring diagram, partially in functional block form, of a fault detector circuit constructed in accordance with the present invention.

Referring now to FIG. 1, a preferred embodiment of the present invention is shown as used to monitor for ground faults in the power leads to a three-phase motor 10. The three-phase motor 10 has three field coils. These coils have a common connection at one end, and their other ends are respectively coupled through leads 12, 14, and 16 to a source of three-phase power 18. The source of three-phase power produces alternating voltage on the three field power leads which are out of phase with respect to one another by one hundred twenty degrees.

In addition to the field coils, the three-phase motor 10 has a control coil which is connected through leads 20 and 22 and a relay switch 24 to a source of AC control power 26. This AC control power has a frequency of sixty hertz and a magnitude on the order of 120 volts RMS.

All of the leads extend through the centers of toroidal transformer cores 28 and 30. The power and control leads pass through the toroidal transformer core 28 so as to function as the primary winding of a transformer. The power and control leads pass through the transformer core 30 so as to function as a secondary winding of a transformer. As will be explained in greater detail hereafter, one of the particular advantages of the present invention is that due to improved noise rejection characteristics the relatively inexpensive low permeability toroidal cores can be used for cores 28 and 30.

In keeping with an important aspect of the present invention, a secondary winding 32 of transformer core 28 is coupled to and fault-current sensing circuit 34 through a series connected capacitor 36 and a resistor 38 forming a filter. Gain from the secondary winding 32 to the output of the AC amplifier 68 is determined by the impedance of the RLC circuit and the value of feedback resistor 78. The resonant frequency of the RLC circuit is approximately one-third of the lowest frequency of interest. Optimum band width is obtained by selecting resistor 38 to have a value R equal to one and four-tenths the square root of the ratio of the inductance to the capacitance where L is the inductance of the transformer of core 28 and C is the value of capacitor 36.

A primary winding 40 of transformer core 30 is also coupled to the fault-current sensing circuit 34 through a lead 42. A common junction 44 between secondary winding 32 and primary winding 40 is also coupled to the over current sensing circuit 34 through a lead 46. The transformer of primary winding 40 of transformer core 30 is employed to impose a higher frequency tickler current signal on the power and control lines in response to a ground fault on neutral line 22. This tickler current, in turn, is detected through means of the transformer of secondary winding 32 and transformer core 28 in the same fashion as a ground fault is detected on the three-phase power leads 12, 14 and 16 or on the control power lead 20. The frequency of the tickler signal is on the order of four thousand hertz. This filter is designed to minimize noise sensitivity in those portions of the frequency spectrum below the power line frequency of fifty or sixty hertz and above the tickler frequency.

When an excessive current is detected by the fault current sensing circuit 34, it actuates a relay drive circuit 48. Upon actuation, the relay drive circuit 48 deenergizes a relay coil 50 to allow the normally closed relay contacts 24 to open and disconnect AC control power from the three-phase motor 10. The fault current sensing circuit 34 is powered by a suitable DC power supply 52. DC power supply 52, in turn, receives AC power through a lead 54 and through a normally closed reset switch 56 and leads 58 and 60.

A trip indicator circuit 62 provides a visual indication that relay coil 50 is energized.

A circuit comprising a normally open push button switch 64 and resistor 66 coupled between one side of the AC power from the source of AC control power 26 and power lead 22 provides a means of testing the circuit. In the absence of any faults, the net current and thus the net field established thereby through toroidal core 28 is null. In the event of a fault, on the other hand, a small imbalance in the field is created, such that a small detection current is developed from the secondary winding 32. This causes the fault current sensing circuit 34 to actuate the relay drive circuit 48. In the event of a ground fault on the neutral lead from the AC control power source 26, a feedback circuit develops which causes the over current sensing circuit 34 to produce a tickler signal of higher frequency on primary winding 40. This tickler signal is imposed on all the lines extending through transformer core 28 and detected in the same way as if an imbalance were created due to a fault on any of the three-phase power leads 12, 14 and 16 or the control lead 20.

Figure 2:
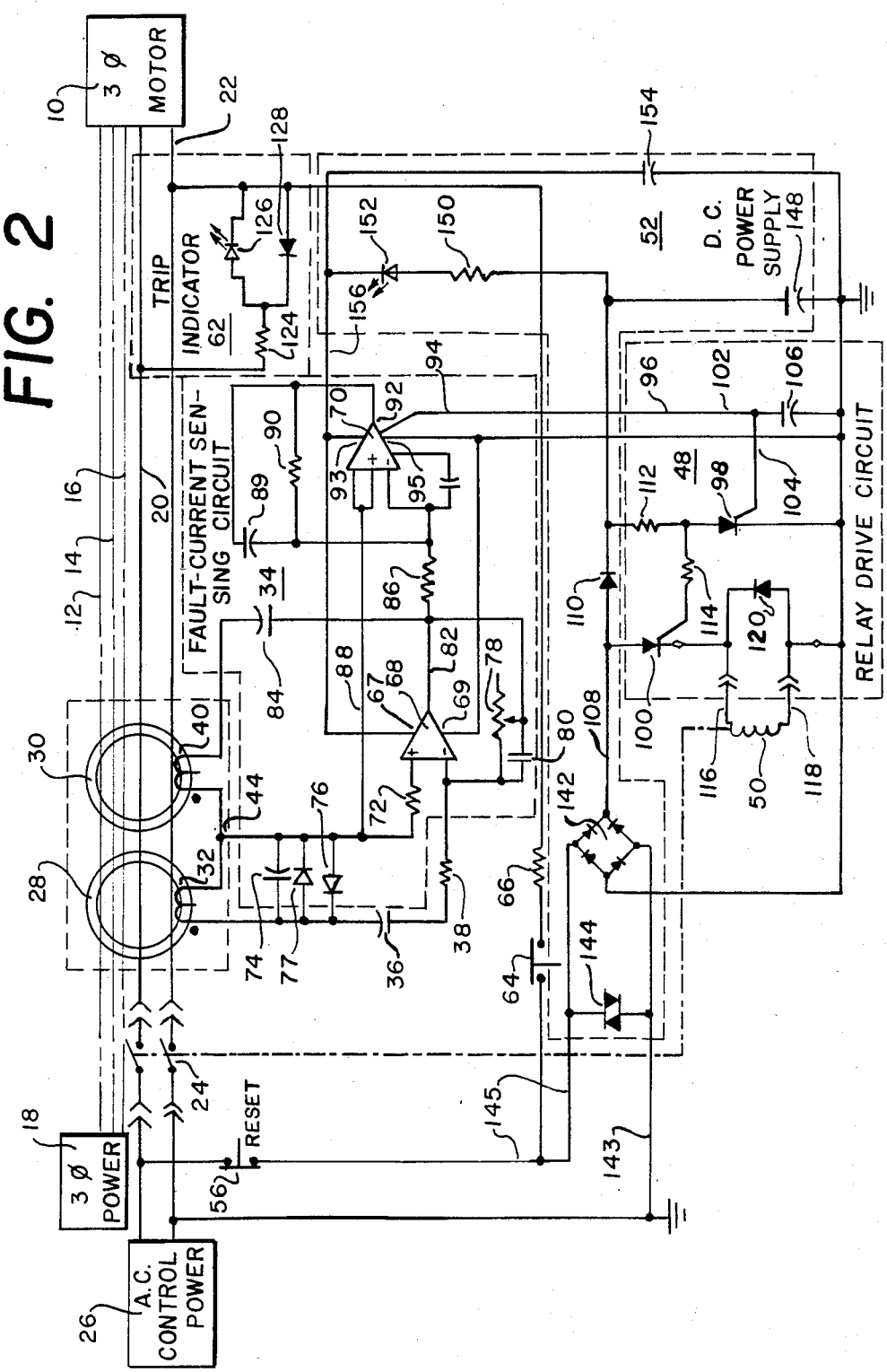
FIG. 2 is a schematic of the detection circuit showing the circuit details of the functional circuit blocks of FIG. 1.

Referring now to FIG. 2, the various functional blocks shown in FIG. 1 will be described in greater detail, and the specifics of the operation of the circuit will be made apparent. The overcurrent sensing circuit 34 is seen to include an inverting operational AC amplifier 68, and a combined level detector and operational amplifier 70. Advantageously, since amplifier 68 is an AC amplifier, the need for strict DC supply stability and DC noise problems are eliminated here. The AC amplifier 68 has its inverting input coupled to the secondary winding 32 through filter resistor 38 and capacitor 36. The positive DC voltage from DC power supply 52 is applied to an input 67, and the negative DC supply voltage is applied to another input 69.

The non-inverting input of amplifier 68 is coupled through a resistor 72 to the junction 44 between secondary windings 32 and 40 which 44 is kept at virtual ground. Coupled between junction 44 on the other side of secondary winding 32 is a capacitor 74 for further filtering of the input signal. A pair of reverse polarity parallel connected diodes 76 and 77 protect amplifier 68 from excessive voltage swings.

The gain of amplifier 68, and the trip level, is established by the setting of a potentiometer resistor 78 and a parallel connected filter capacitor 80 which establishes a negative feedback path between the output 82 of amplifier 68 and its inverting input.

A regenerative feedback circuit for amplifier 68 is used to detect a ground fault on the load side of the neutral power lead 22. This positive feedback path includes a capacitor 84, and the transformers of core 28 and 30. Under normal operating conditions when there is no fault, the amplifier 68 produces a substantially zero level output. However, if a ground fault develops on the load side of the neutral power lead 22 through an impedance of four ohms or less, a positive feedback circuit is created by virtue of the ground loop coupling the two transformers together. This ground loop is created by neutral wire 22 passing through both toroidal cores 28 and 30 and being connected to ground at opposite sides of cores 28 and 30. In that event, amplifier 68 begins to oscillate and produces a relatively high frequency alternating signal, or tickler signal on its output 82. This signal, in turn, is coupled to the level detector and amplifier 70 which causes it to actuate the relay drive circuit 48 to remove power from the load.

In keeping with another aspect of the invention, it was discovered that if the inductance of the transformer at core 28 which forms the inductor of the RLC circuit decreases below a critical predetermined value, the gain of the combined filter and amplifier fluctuates significantly with fluctuations of the inductance. This of course, causes the trip level to fluctuate uncontrollably. Since the inductance fluctuates with the permeability of the core 28 which, in turn, fluctuates with temperature, the sensitivity of the amplifier 68 will also fluctuate with temperature. However, it was also determined that the gain, or sensitivity, does not significantly vary with changes in inductance above the critical predetermined value. This problem of temperature instability is overcome in the present invention by first determining the level beneath which inductance value variations cause amplifier sensitivity variations. Then a transformer core 28 is provided with a sufficiently high inductance to insure that temperature changes within the selected temperature operating range will not cause it to decrease beneath the predetermined critical inductance value. For the circuit of FIG. 2, with capacitor 74 having a value of 0.022 microfarads, capacitor 36 having a value of ten microfarads and resistor 38 having a value of one kilohm, the critical inductance value was determined to be on the order of two henry and an inductance level of ten henry was found to be sufficiently high to prevent the inductance from dropping to the critical level over the normal operating temperature range of negative thirty-five degrees centigrade to sixty-six degrees centigrade.

The amplified signal produced on output 82 is coupled through a current limiting resistor 86 to the inverting input of the operational amplifier portion of level detector amplifier 70. This signal is amplified and produced on output 92. It is then fed back through a parallel connection of a capacitor 89 and a resistor 90 to the inverting input to establish the gain and provide negative feedback stability. Positive and negative DC supply voltage is respectively applied to inputs 93 and 95 to power the amplifier level detector 70.

The amplified signal produced by the amplifier portion of circuit 70 is also internally coupled to the input of the level detector portion which produces a logic 1-state signal on its output 94 when the amplified signal exceeds a predetermined value. Otherwise a 0-state signal is produced on output 94.

In the absence of a fault, the 0-state signal from output 94 and applied to input 96 of the relay drive circuit 48 keeps the relay coil 50 energized which, in turn, keeps the normally open relay contact 24 in a closed position. Under these conditions, the 0-state signal is applied through a lead 102 to the gate input of an SCR 98 which is thereby kept off. The SCR 100, on the other hand, is kept on by virtue of trigger current applied to its gate input from a positive DC power supply voltage on a lead 108. This trigger current is coupled through a diode 110, a resistor 112 and a current limiting resistor 114.

When a fault is detected, the relay drive circuit is actuated by a 1-state signal from output 94 to deenergize the relay coil 50. This causes the relay contacts 24 to open and disconnect power. The 1-state signal is applied to the junction of the trigger input of SCR 98 and a capacitor 106. The charging of capacitor 106 delays immediate reaction to the 1-state signal in the event the fault signal is only a transient noise spike.

However, if the 1-state signal persists, after a preselected time, the capacitor charges to a level of sufficient magnitude to cause SCR 98 to be triggered on. This, in turn, causes the trigger current for SCR 100 from diode 110 and resistor 112 to be diverted through SCR 98. Accordingly, SCR 100 turns off and relay coil 50 is deenergized.

Although this causes disconnection of AC control power from the motor load 10, AC power continues to be applied to the DC power supply 52. Accordingly, the current through SCR 98 continues uninterrupted even after the 1-state fault signal is terminated. The circuit is reset by the opening and closing of reset switch 56. When switch 56 is open, AC power to the DC power supply 52 and thus power from the DC power supply to SCR 98 is disconnected and the SCR 98 turns off. When switch 56 is again closed, the fault current sensing circuit 34 and the relay drive circuit 48 are again enabled to operate, as described above.

The DC power used to power the circuitry of the fault current sensing circuit is obtained from a fullwave, bridge rectifier 142. Bridge rectifier 142 is AC powered from the source of AC control power 26 via leads 143 and 145. An MOV switch 144 protects the bridge rectifier 142 from high voltage transients. The positive output of the bridge rectifier 142 is coupled through a lead 108, a diode 110, a resistor 150 and a diode 152 to a regulating capacitor 154 coupled to ground. The regulated positive DC voltage at the junction of diode 152 and capacitor 154 is coupled through a lead 156 to the fault current sensing circuit 34. Diode 152 is a light emitting diode to provide a status indication of regulated power application.

The trip indicator circuit 62 comprises a pair of reverse polarity, parallel connected diodes 126 and 128 connected in series with a current limiting resistor 124 between the AC control power leads 20 and 22. Diode 126 is a light emitting diode which is normally lit and turns off to provide a visual trip indication when relay switch 24 is caused to open.

While a particular embodiment of the present invention has been disclosed in detail, it should be appreciated that many variations may be made thereto without departing from the scope of the invention as defined in the claims. For instance, although the invention is disclosed as a ground fault detector for a three-phase motor having five power input leads, it is also suitable for use in monitoring other numbers of power leads or loads other than a three-phase motor and is also useful in other types of circuits such as DC power, AC power regulators, phase converters, frequency converters, adjustable frequency drive circuits and other circuits in which temperature stability and noise immunity are necessary features.

We claim:

1. A ground fault detection circuit comprising:
   means including an amplifier for producing a sensing signal in response to ground fault current exceeding a preselected value; and
   a band pass filter including a series RLC circuit coupled to the input of the amplifier for providing a frequency response to said sensing signal producing means to minimize sensitivity to noise in selected portions of the frequency spectrum.

2. The ground fault detection circuit of claim 1 in which said sensing signal producing means includes a transformer responsive to said ground fault current and the inductor of said RLC series circuit includes a winding of said transformer.

3. The ground fault detection circuit of claim 2 in which said transformer is a current transformer.

4. The ground fault detection circuit of claim 1 in which said fault current is detected at two substantially different frequencies and said selected portions of the frequency spectrum at which said noise sensitivity is minimized include substantially all of the frequency spectrum less than the least of said two different frequencies and substantially all of the frequency spectrum greater than the largest of said two different frequencies.

5. The ground fault detection circuit of claim 4 in which said current through a load current carrying circuit is monitored, and said load current has a selected frequency comprising the lower of said two different frequencies.

6. The ground fault detection circuit of claim 4 including means for imposing a tickler fault current into the load current carrying circuit and in which said tickler fault current is operated at a selected frequency comprising the greater of said two different frequencies.

7. The ground fault detection circuit of claim 1 in which said frequency response of said sensing signal producing means is substantially uniform between two of said selected portions if the spectrum.

8. The ground fault detection circuit of claim 1 include means for imposing a tickler current on a load current carrying circuit at a frequency less than the highest one of said selected portions of the frequency spectrum, and means responsive to said tickler current for disconnecting a load from the load current carrying circuit.

9. The ground fault detection circuit of claim 1 in which said fault current includes a differential load current at one frequency and a tickler current at another frequency, and said filter reduces the sensitivity of said sensing signal producing means to signals of a frequency substantially less than said one frequency and substantially more than said other frequency.

10. The ground fault detection circuit of claim 9 in which said one frequency is on the order of sixty hertz.

11. The ground fault detection circuit of claim 10 in which the frequency response providing means provides a substantially uniform response to said sensing signal producing means for frequencies between said one frequency and said greater frequency.

12. The ground fault detection circular of claim 1 in which said amplifier includes an AC amplifier stage substantially impervious to DC noise.

13. The ground fault detection circuit of claim 12 in which said amplifier includes a second amplifier stage coupled so said AC amplifier stage and a level detector responsive to the output of said second stage amplifier.

14. The ground fault detection circuit of claim 13 in which said filter includes a resistor connected between a transformer coupled with said fault current and the sensing signal producing means.

15. The ground fault detection circuit of claim 14 in which said filter includes a capacitor connected in series with said resistor.

16. The ground fault detection circuit of claim 1 in which said filter includes a resistor, an inductor and a capacitor and the value of the resistor is substantially equal to one and four-tenths times the square root of the ratio of the inductance to the capacitance.

17. An amplifier circuit comprising:
a transformer of selected inductance coupled to an input current carrying circuit;
an amplifier for producing a voltage output signal proportionate to said input current;
means including a series RLC filter comprised in part of said inductance for coupling said input current to said amplifier and for establishing a selected frequency response for the circuit; and
means associated with said transformer for establishing a selected inductance level for said filter of sufficient magnitude to insure that temperature related to fluctuation of the inductance level will not substantially affect the sensitivity of the circuit.

18. The circuit of claim 17 including
a second amplifier coupled with the first amplifier to produce an amplified sensing signal, and
a level detector for producing an output signal in response to said amplified signal exceeding a preselected value.

19. The circuit of claim 17 in which the band pass filter comprises an RLC circuit.

20. The circuit of claim 17 in which the secondary winding inductance comprises a portion of said filter.

21. The circuit of claim 17 in which said transformer is a differential transformer and said input current carrying circuit is a load current carrying circuit being monitored for short circuits.

22. The circuit of claim 17 in which said inductance level establishing means includes a core for said transformer of selected permeability.

23. The circuit of claim 17 in which said inductance establishing means includes a selected number of windings for said transformer.

* * * * *